(12) United States Patent
Ishiguro

(10) Patent No.: US 11,570,331 B2
(45) Date of Patent: Jan. 31, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Taisuke Ishiguro, Kamagaya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 16/920,996

(22) Filed: Jul. 6, 2020

(65) Prior Publication Data

US 2021/0014383 A1 Jan. 14, 2021

(30) Foreign Application Priority Data

Jul. 8, 2019 (JP) .............................. JP2019-127180

(51) Int. Cl.
| | | |
|---|---|---|
| *H04N 1/409* | (2006.01) | |
| *G06T 7/13* | (2017.01) | |
| *G06T 7/136* | (2017.01) | |
| *G06T 5/50* | (2006.01) | |
| *H04N 1/405* | (2006.01) | |

(52) U.S. Cl.
CPC .............. *H04N 1/4092* (2013.01); *G06T 5/50* (2013.01); *G06T 7/13* (2017.01); *G06T 7/136* (2017.01); *H04N 1/405* (2013.01); *G06T 2207/10008* (2013.01); *G06T 2207/20192* (2013.01); *G06T 2207/20212* (2013.01)

(58) Field of Classification Search
CPC ...... H04N 1/4092; H04N 1/405; G06T 7/136; G06T 7/13; G06T 5/13; G06T 5/50; G06T 2207/10008; G06T 2207/20192; G06T 2207/20212
USPC ....................................... 358/2.99, 1.9, 1.15
See application file for complete search history.

(56) References Cited

U.S. PATENT DOCUMENTS

| | | | |
|---|---|---|---|
| 9,694,598 B2 * | 7/2017 | Ishikawa | ................ B41J 2/2142 |
| 10,949,972 B2 * | 3/2021 | Guo | ..................... G06V 20/188 |
| 2020/0014820 A1 * | 1/2020 | Imaizumi | ............... H04N 1/407 |

FOREIGN PATENT DOCUMENTS

| | | | |
|---|---|---|---|
| JP | 2000348138 A | | 12/2000 |
| KR | 20090045587 A | * | 5/2009 |

* cited by examiner

*Primary Examiner* — Quang N Vo

(74) *Attorney, Agent, or Firm* — Rossi, Kimms & McDowell LLP

(57) ABSTRACT

A binary image is generated from a multivalued image based on a threshold, an edge is extracted from the multivalued image, an edge image is generated by correcting a position of the extracted edge, and a synthetic binary image is generated by synthesizing the edge image and the binary image.

11 Claims, 13 Drawing Sheets

FIG. 3A

```
ABC BOOKSTORE                    301
   XY BRANCH

TEL 0123-456-789
2018年12月03日(月)  13:00
 CHILDREN'S BOOK      ¥500
 NOTEBOOK             ¥150
 ---------------------------
 SUBTOTAL             ¥650
  ( CONSUMPTION TAX   ¥52)
 TOTAL                ¥702
 PAYMENT              ¥710
 CHANGE                 ¥8
```

FIG. 3B

```
 ABC BOOKSTORE
   XY BRANCH

TEL 0123-456-789
2018年12月03日(月)  13:00       302
 CHILDREN'S BOOK      ¥500
 NOTEBOOK             ¥150
 SUBTOTAL             ¥650
  ( CONSUMPTION TAX   ¥52)
 TOTAL                ¥702
 PAYMENT              ¥710
 CHANGE                 ¥8
```

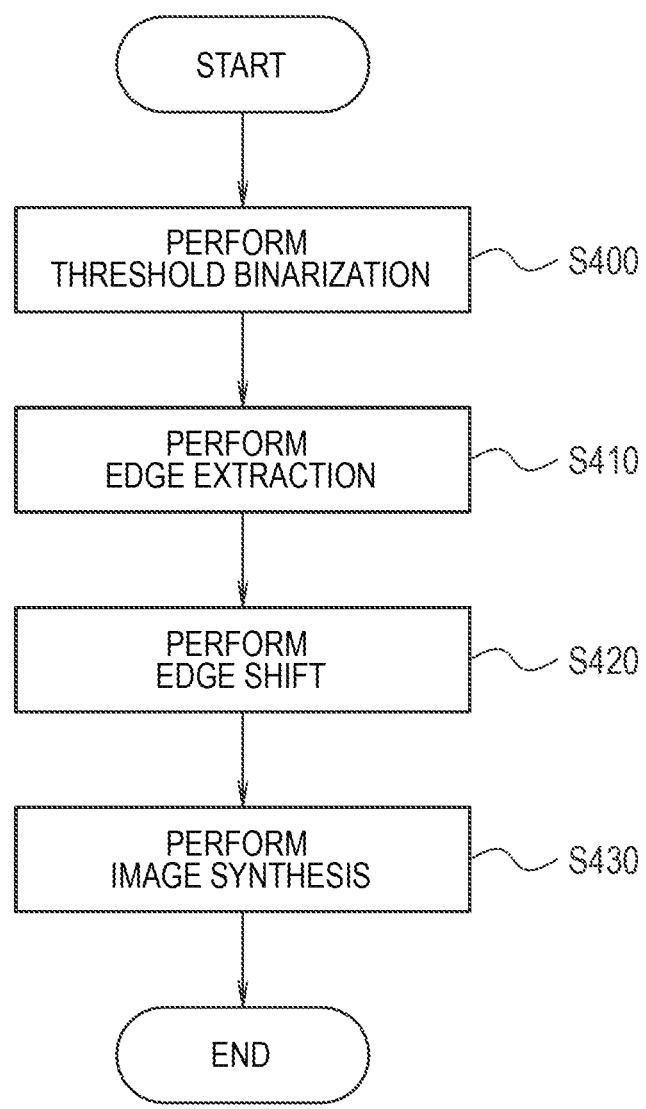

FIG. 10

|  | CONDITION CONTENTS |
|---|---|
| CONDITION 1 | HEIGHT OF EDGE CC IS LARGER THAN THRESHOLD |
| CONDITION 2 | HEIGHT OF EDGE CC IS SMALLER THAN THRESHOLD<br>AND<br>AS A RESULT OF SYNTHESIZING EDGE CC AND THRESHOLD BINARY IMAGE, PIXELS OF EDGE CC AND THRESHOLD BINARY IMAGE ARE NOT CONTINUOUS |

IMAGE PROCESSING APPARATUS, IMAGE PROCESSING METHOD, AND STORAGE MEDIUM

BACKGROUND OF THE INVENTION

Field of the Invention

The present disclosure relates to an image processing technique of generating a binary image from a multivalued image obtained by scanning or the like.

Description of the Related Art

Japanese Patent Application Laid-Open No. 2000-348138 discloses a technique of performing density correction of an image by controlling a threshold when binarizing multivalued data. With use of the technique disclosed in Japanese Patent Application Laid-Open No. 2000-348138, by increasing the threshold, a character pixel that has a high gradation value and has been faded can be binarized as a pixel that is effective as a character line.

However, in Japanese Patent Application Laid-Open No. 2000-348138, there is a case where a pixel that is not essentially desired to be effective as a character pixel is reluctantly made effective. For example, as a result of increasing the threshold so as to be able to make the faded character pixel effective, there is a case where a pixel being not the character pixel is also made effective and thus a pixel existing between character lines in a character (i.e., a non-character pixel in the character) comes to be a character pixel so that a character shape is lost. Here, there is a case where the gradation value of the non-character pixel in the character becomes low due to noise occurring in scanner reading, data compression occurring in scan image generation, and the like. For this reason, by simply using the threshold, it is difficult to make effective only the character pixels as the binary images without excess and deficiency.

SUMMARY OF THE INVENTION

In the present disclosure, an image processing apparatus is characterized by: generating a binary image from a multivalued image by using a threshold; generating an edge image by correcting a position of an edge extracted from the multivalued image, based on the multivalued image; and generating a synthetic binary image by synthesizing the edge image and the binary image.

Further features of the present disclosure will become apparent from the following description of exemplary embodiments with reference to the attached drawings.

BRIEF DESCRIPTION OF THE DRAWINGS

FIGS. 3A and 3B are diagrams for describing examples of detection results of a scan image and a character string area.

FIG. 4 is a flowchart for describing a blurred character interpolation binarization process according to a first embodiment.

FIG. 10 is a diagram for describing an example of a noise determination table.

DESCRIPTION OF THE EMBODIMENTS

Hereinafter, preferred embodiments of the present invention will be described in detail with reference to the attached drawings. Incidentally, the constitutions and configurations described and illustrated in the following embodiments are merely examples, and the present invention is not limited to the described and illustrated constitutions and configurations.

System Configuration Example

Figure 1:
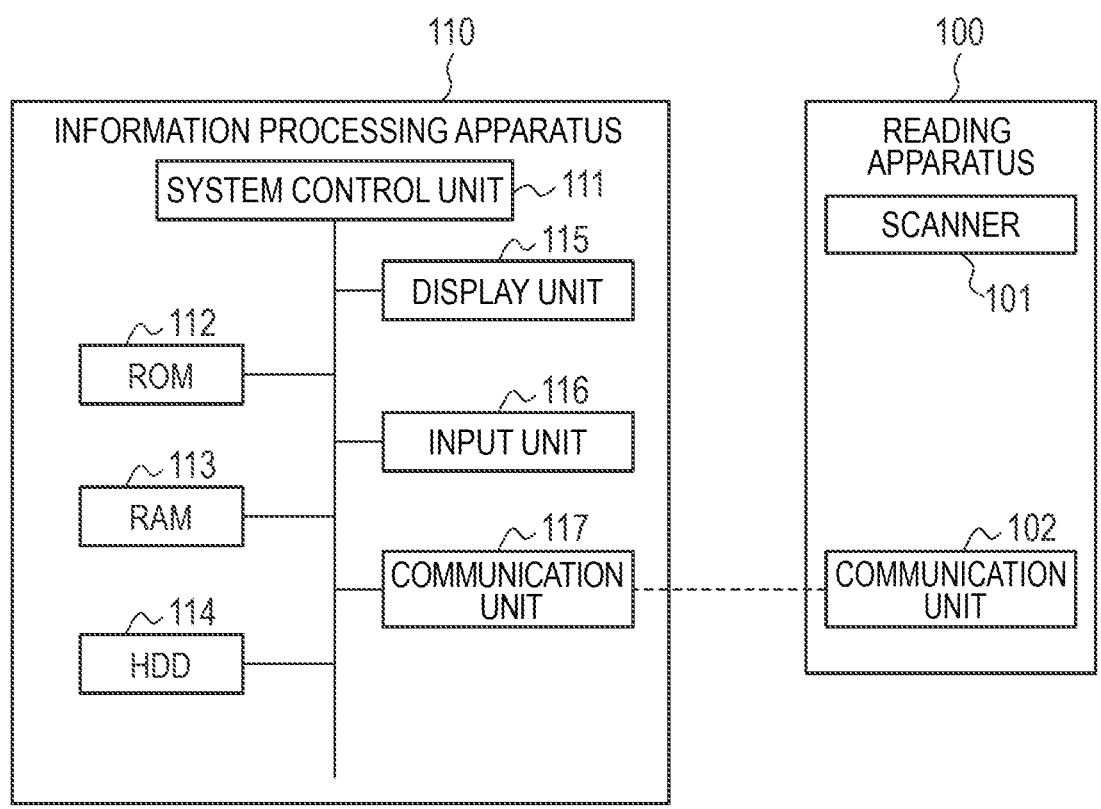
FIG. 1 is a diagram for describing an example of a configuration of an information processing system according to an embodiment.

FIG. 1 is a diagram for describing an example of a schematic configuration of an information processing system to which an image processing apparatus according to the embodiment is applied. The information processing system includes a reading apparatus 100, and an information processing apparatus 110 that is an example of the image processing apparatus according to the embodiment. Besides, the reading apparatus 100 includes a scanner 101 and a communication unit 102. The scanner 101 reads a document, and generates a scan image (i.e., an image obtained via scanning). Here, data of the scan image is multivalued image data. The communication unit 102 communicates with an external device via a network.

The information processing apparatus 110 includes a system control unit 111, a read only memory (ROM) 112, a random access memory (RAM) 113, a hard disk drive (HDD) 114, a display unit 115, an input unit 116, and a communication unit 117. The system control unit 111 reads a control program stored in the ROM 112 and thus executes various processes. The RAM 113 is used as a main memory of the system control unit 111, and a temporary storage area such as a work area. The HDD 114 stores therein various data including the data of the scan image, various programs, and the like. Incidentally, later-described functions and processes of the information processing apparatus 110 are realized by the system control unit 111 reading programs stored in the ROM 112 or the HDD 114 and executing the read programs.

The communication unit 117 performs a communication process with an external device via a network. The display unit 115 displays various types of information. The input unit 116 has a keyboard and a mouse, and accepts various operations by a user. Incidentally, the display unit 115 and the input unit 116 may be integrally provided like a touch panel. Besides, the display unit 115 may perform projection using a projector, and the input unit 116 may recognize a fingertip position with respect to a projected image with a camera.

In the embodiment, the scanner 101 of the reading apparatus 100 reads a paper document such as a business form or the like, and thus generates a scan image. The data of the scan image is transmitted to the information processing apparatus 110 by the communication unit 102. In the information processing apparatus 110, the communication unit 117 receives the data of the scan image, and stores the received data in a storage device such as the HDD 114.

First Embodiment

Figure 2:
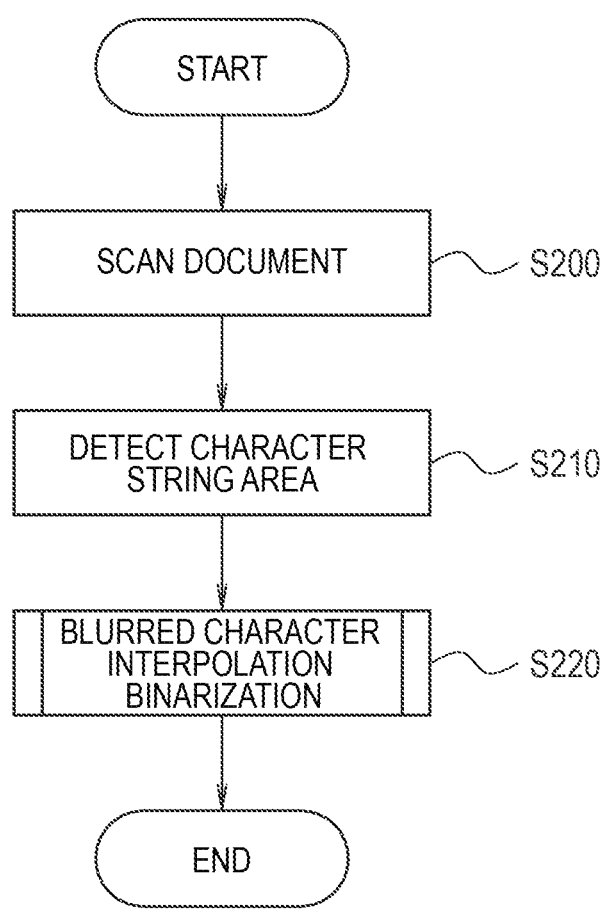
FIG. 2 is a flowchart for describing a rough flow of an image generation process according to the embodiment.

FIG. 2 is a flowchart for describing an example of a rough flow of an image generation process of the first embodiment to be performed in the information processing apparatus 110. The process of this flowchart is realized by the system control unit 111 of the information processing apparatus 110 executing in accordance with the program stored in the ROM 112.

Initially, in S200, the system control unit 111 receives, via the communication unit 117, data of a scan image transmitted by the scanner 101 scanning a paper document according to an instruction from a user. Then, the system control unit 111 stores the received data of the scan image in a storage unit such as the HDD 114. FIG. 3A is a diagram for describing an example of a scan image 301 obtained by the relevant process.

Next, in S210, the system control unit 111 reads the scan image stored in the storage unit such as the HDD 114, and performs a character string area detection process on the read scan image. Then, the system control unit 111 stores information of a detection result of the character string area detection process in the RAM 113. Here, the character string area detection process is a process of detecting an area that includes a character string being a character recognition target in the scan image. The character string area detection process is realized by projecting the entire image in the x-axis direction, and detecting as the character string an area whose gradation value is equal to or smaller than a threshold. The detected character string area is expressed as rectangular area coordinates (positional coordinates indicating the four corners of the character string area) including the character string area. FIG. 3B is a diagram for describing an example of the detection result of the character string area in regard to the scan image 301, and a character string area 302 surrounded by the broken line is the detected character string area. Incidentally, the above character string area detection process is merely an example, and any other method may be used as long as the character string area can be detected. Namely, a concrete method does not matter.

Next, in S220, the system control unit 111 performs an interpolation process on blurred character pixels in regard to the scan image of each character string area, performs a re-binarization process using a threshold, and then stores data of a binary image regenerated by the re-binarization process in the RAM 113. Details of such a blurred character interpolation binarization process to be performed in S220 will be described later with reference to FIG. 4.

By the above process, also a scan image including a blurred character can be binarized without excess and deficiency of character pixels. Thus, by performing a character recognition process on the binary image, it is possible to improve character recognition accuracy of optical character recognition (OCR) in the system of FIG. 1.

Subsequently, the blurred character interpolation binarization process in S220 of FIG. 2 will be described with reference to FIG. 4. FIG. 4 is the flowchart for describing an example of the blurred character interpolation binarization process according to the present embodiment.

Initially, in S400, the system control unit 111 refers to the RAM 113, and thus obtains the scan image and the rectangular area coordinates indicating the character string area to be processed. Further, by using such obtained information, the system control unit 111 performs the image generation process, in which a binarization process (threshold binarization) using a predetermined threshold is performed on an area indicated by the rectangular area coordinates in the scan image and thus the binary image is generated. Then, the system control unit stores the data of the binary image in the RAM 113.

Here, the binarization process is the image generation process of setting a pixel having a gradation value equal to or higher than the predetermined threshold as a white pixel, setting a pixel having a gradation value smaller than the predetermined threshold as a black pixel, and converting these pixels into image data of two gradations.

Figure 5A:
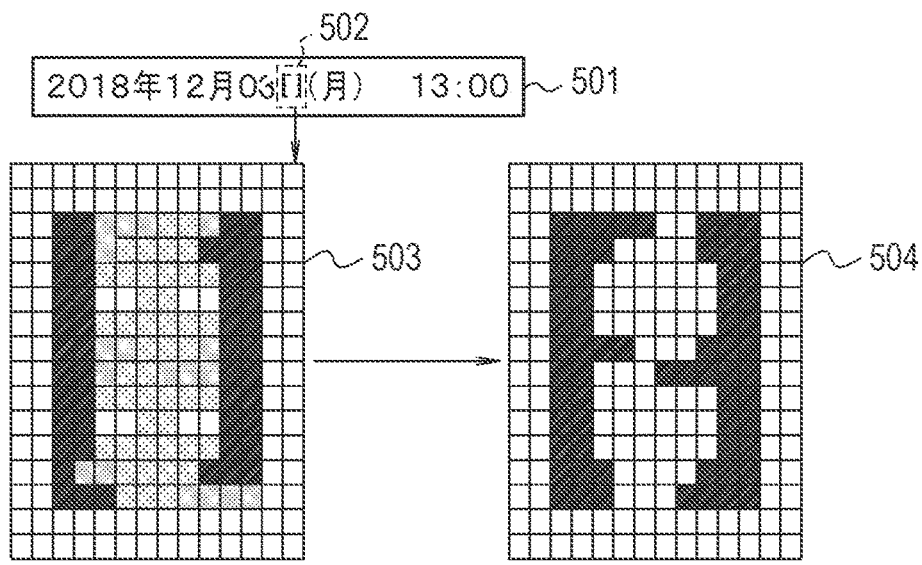
FIGS. 5A, 5B, 5C and 5D are diagrams for describing examples of a scan image, a binary image, and an edge image.

FIG. 5A is a diagram to be used to describe an example of a result of the binarization process. A binarization-target image 501 is an image (the character string area 302 of FIG. 3B) extracted from the scan image 301 as a process-target area. An original image 503 is an image obtained by enlarging a focused area 502 in the binarization-target image 501. The result of the threshold binarization for the original image 503 is a threshold binary image 504.

Incidentally, in the present embodiment, as the predetermined threshold, a predetermined prescribed value may be used, or a threshold adaptively calculated by various threshold calculation methods. As the threshold calculation method, for example, it is possible to use a method of adaptively calculating a threshold using a gradation value distribution in an image.

Next, in S410, the system control unit 111 performs an edge extraction process on the scan image and the character string area obtained in S400, and performs an edge generation process to generate an edge image based on a result of the edge extraction process. Then, the system control unit 111 stores data of the generated edge image in the RAM 113.

Here, the edge extraction process is a process of extracting, as an edge candidate, a portion where a gradient of a gradation value occurs between adjacent pixels. Here, the gradient of the gradation value is obtained by performing first derivation on a change amount of a pixel gradation value with respect to each of the x axis and they axis of an image. Then, the system control unit 111 identifies the pixel at the maximum point of the change amount of the pixel gradation value as a pixel of the edge candidate, and turns the pixel of the edge candidate into a black pixel.

Figure 5B:
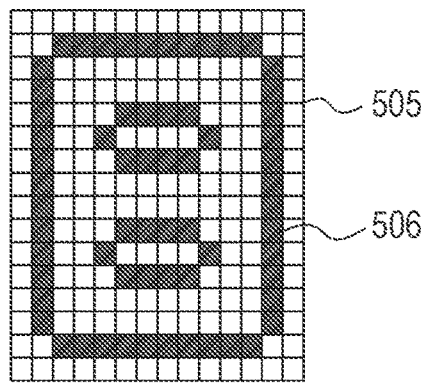

FIG. 5B is a diagram showing an example of a result of synthesizing the pixels extracted as an x-axis edge candidate and the pixels extracted as a y-axis edge candidate. An edge extraction result image 505 is an edge extraction result for the original image 503. An edge portion 506 is obtained by turning each pixel of the extracted edge candidates into the black pixel.

Incidentally, although the edge extraction is performed using the first derivation in the present embodiment, the method for the edge extraction does not matter as long as the edge can be identified.

Next, in S420, the system control unit 111 refers to the RAM 113, and thus obtains the image of the edge candidate and the scan image of the area corresponding to the image of the edge candidate. Further, the system control unit 111 corrects the position of the image of the edge candidate based on the obtained gradation value of the scan image and the image of the edge candidate, and stores the corrected image in the RAM 113 as the data of the edge image. More specifically, the system control unit 111 refers to the pixel adjacent to the pixel of the scan image at the position corresponding to the pixel of the edge candidate (the black pixel being the edge candidate), and shifts the pixel value of the edge candidate to the pixel having the smaller gradation value, thereby obtaining the edge image. Here, the shift is performed for each of the x-axis edge candidate image and the y-axis edge candidate image. That is, in the case of the edge shift using the x-axis edge candidate image and the scan image, the system control unit 111 refers to the left and right gradation values of the pixel in the scan image of the position corresponding to the x-axis edge candidate pixel. Then, the system control unit 111 shifts the pixel of the edge candidate by one pixel in the x-axis direction with respect to the pixel having the smaller gradation value, thereby obtaining the edge pixel. Similarly, in the case of the edge shift using the y-axis edge candidate image and the scan image, the system control unit 111 refers to the upper and lower gradation values of the pixel in the scan image corresponding to the y-axis edge candidate pixel. Then, the system control unit 111 shifts the pixel of the edge candidate by one pixel in the y-axis direction with respect to the pixel having the smaller gradation value, thereby obtaining the edge pixel.

Figure 5C:
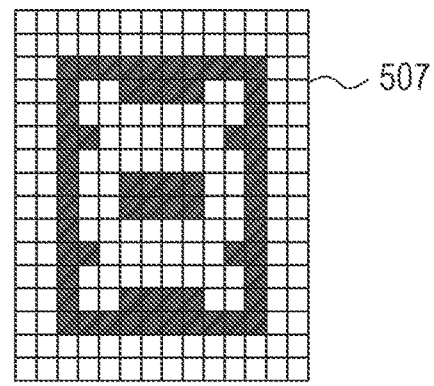

FIG. 5C is a diagram showing an example of a result of the edge shift. An edge shift result image 507 is an edge image obtained as a result of performing the edge shift on the edge extraction result image 505 based on the original image 503. That is, the edge shift result image 507 is an edge image to be synthesized with the threshold binarization result image of S400 in next S430.

Figure 5D:
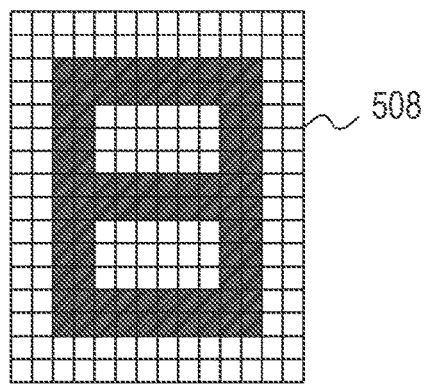

Next, in S430, the system control unit 111 obtains the edge shift result image and the threshold binarization result image from the RAM 113, and performs a synthesis process on these two images to generate a synthetic binary image. The image synthesis process to be performed here is a process of performing an OR operation (logical sum operation) with the black pixels being "1" and the white pixels being "0". That is, the pixel that was the black pixel in either the edge shift image or the threshold binarization result image is set as the black pixel also in the synthesis result, and the synthetic binary image is generated. FIG. 5D is a diagram showing an example of a synthetic binary image 508 generated by the image synthesis process. According to FIG. 5D, since the edge image (edge shift result image), the edge, and the threshold binary image are synthesized, it can be understood that the character pixels that have lacked in the threshold binary image alone become the black image and can be made effective.

As described above, according to the present embodiment, by synthesizing the edge image and the threshold binary image, even for the image in which the character pixels cannot be binarized without excess and deficiency by the process using only the threshold, it is possible to generate the binarized image that eliminates the lack of the character pixels and makes non-character pixels effective. Besides, according to the present embodiment, by shifting the pixel position of the edge image based on the gradation value of the scan image, it is possible to regenerate the binary image in which the character pixels are made effective without excess and deficiency. Incidentally, in a known edge extraction process, edge pixels tend to be generated outside a character line. Therefore, when the threshold binary image and the edge image to which the edge shift process is not applied are simply combined, a binary image in which the pixel existing outside the character pixels is made effective is merely generated. As a result, it adversely affects accuracy of the character recognition process. On the other hand, in the present embodiment, since the edge shift process is applied, it is possible to avoid such a problem as the pixel existing outside the character pixels is erroneously made effective.

Second Embodiment (Pixel Dropout Interpolation)

In the first embodiment, the binarized image is generated by synthesizing the edge image after the edge shift and the threshold binary image. However, for example, in a case where the character line is thick, there is a case where a gap occurs between the edge image and the threshold binary image. In the second embodiment, there will be described a process of generating a binary image such that excess and deficiency of the character pixels do not occur even when the gap occurs between the edge image and the threshold binary image. Incidentally, the description of the contents common to the first embodiment such as the control flow and the like will be omitted, and an image synthesis process (corresponding to the image synthesis process of S430 in the first embodiment) that is a difference from the first embodiment will be described. Only one of the processes of S430 in the first embodiment and the process of FIG. 6 in the second embodiment may be performed, or both the processes may be performed. Both the processes are performed in the present embodiment, but the description of the process according to S430 of the first embodiment will be omitted in the following description.

Figure 6:
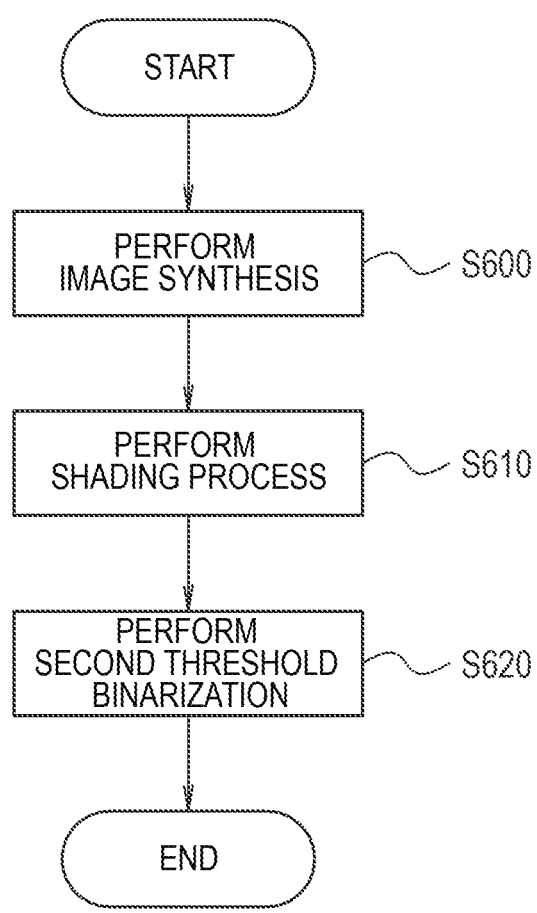
FIG. 6 is a flowchart for describing an interpolation process using a shading process.

FIG. 6 is the flowchart for describing an example of a process of the second embodiment corresponding to the image synthesis process of S430.

Figure 7A:
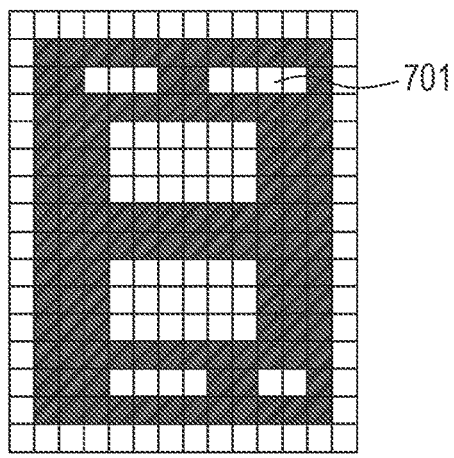
FIGS. 7A, 7B and 7C are diagrams for describing examples of an interpolation process and results thereof.

Since S600 is the same process as that of S430 described above, the description thereof will be omitted. FIG. 7A is a diagram for describing an example of a result obtained by performing the image synthesis process of S600. As illustrated in FIG. 7A, it is assumed that the image resulting from the image synthesis process has thick character lines and character pixel dropouts 701 occur.

Next, in S610, the system control unit 111 refers to the RAM 113, and thus obtains the image data as a result of the image synthesis process. Further, the system control unit 111 performs the interpolation process using a known shading process called a Gaussian filter process on the image, and stores the data after the shading process in the RAM 113.

Figure 7B:
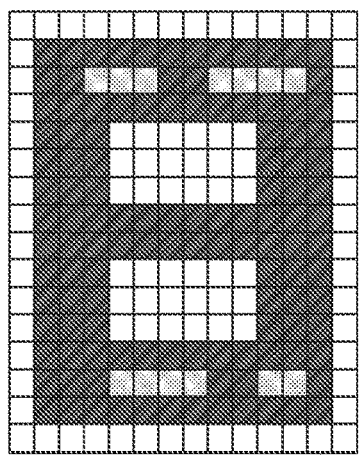

FIG. 7B is a diagram for describing an example of the result of the interpolation process, and shows an image obtained by applying the shading process to the image of FIG. 7A. By applying a Gaussian filter, the processed gradation value is obtained according to a distance between the pixels. Therefore, in a case where there is a vacant area, i.e., a character pixel dropout area, having a short distance such as a gap between the edge image and the threshold binary image, the shading process is strongly applied to the relevant character pixel dropout area. On the other hand, the shading process is weakly applied to a vacant area having a long distance, such as a gap between an actual character line (character pixel) and the character line. As a result, an area where the character pixel dropout occurs is interpolated to a gradation value close to the character pixel (i.e., the gradation value close to black in the example of FIG. 7B). On the other hand, an area that is not the character pixel dropout area, such as an area between the actual character line and the character line, is interpolated to a gradation value different from that of the character pixel (i.e., the gradation value close to white in the example of FIG. 7B).

Figure 7C:
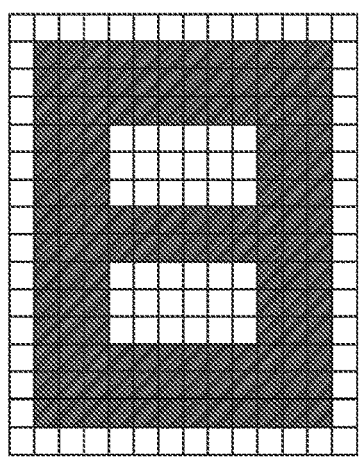

Next, in S620, the system control unit 111 performs a second threshold binarization process on the image after the shading process, and stores the data of the process result in the RAM 113. Here, the second threshold binarization process is similar to the process to be performed in S400 of FIG. 4. FIG. 7C is a diagram for describing an example of the result obtained by applying the relevant process to the image of FIG. 7B.

As described above, according to the second embodiment, even in a case where the character pixel lacks only by simply synthesizing the edge image and the threshold binary image, it is possible by interpolating the lacked pixel with the shading process to generate a binary image having no lack of the character pixel. The lack of the character pixel in the character line causes a decrease in the accuracy of the character recognition process. However, by applying the process of the present embodiment, it is possible to avoid the problem of the lack of the character pixel.

Third Embodiment (Noise Removal)

In the first and second embodiments, the binarization process is performed by synthesizing the edge image with the threshold binary image. However, there is a possibility that the edge image includes an edge other than the character line, i.e., noise for example. In the third embodiment, there will be described a process of, even when the edge image includes noise, generating a binary image so that such a noise portion is not treated as the character pixel. Incidentally, the description of the contents common to the above respective embodiments such as the control flow and the like will be omitted, and an image synthesis process (corresponding to the image synthesis process of S430 in the first embodiment) that is a difference from the already described embodiments will be described. Although the process in the third embodiment is also performed together with the processes in the first and second embodiments described above, only one of these processes may be performed.

Figure 8:
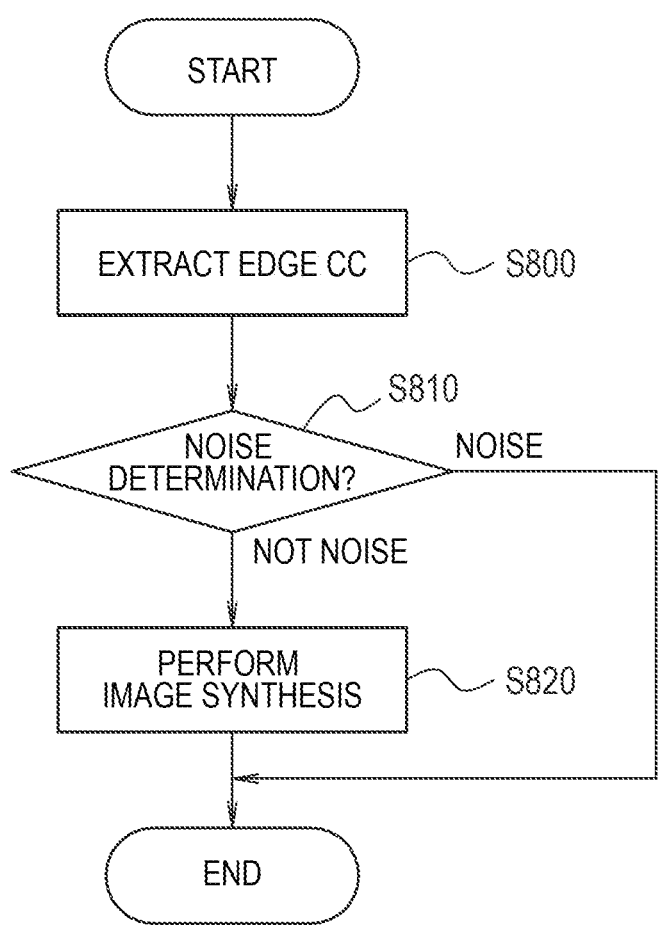
FIG. 8 is a flowchart for describing an image synthesis process based on noise determination.

FIG. 8 is a flowchart for describing an example of the image synthesis process of S430 in the third embodiment. The process of this flowchart is a process of extracting a connected pixel block (hereinafter referred to as a CC (Connected Component)) of the edge image, generating a character candidate area based on a positional relationship of the extracted CC, and performing blurred character determination in regard to the generated character candidate area.

Figure 9A:
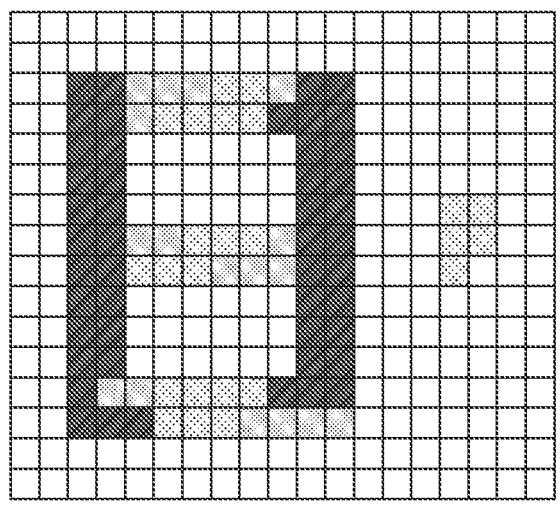
FIGS. 9A and 9B are diagrams for describing examples of the image synthesis process based on the noise determination and the results thereof.
Figure 9B:
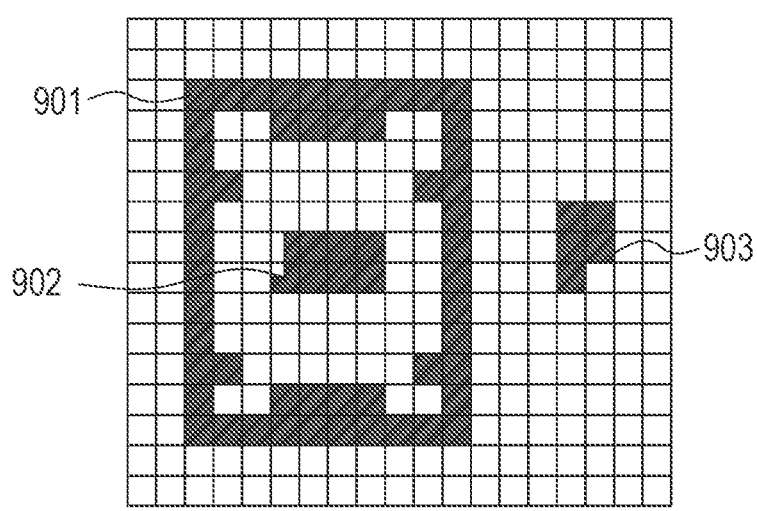

Initially, in S800, the system control unit 111 obtains the edge image from the RAM 113, extracts a CC of the edge image, and stores the extracted information in the RAM 113. Here, the CC is obtained by extracting the black pixels (edge pixels) connected in the edge image, and has information in which the pixels of the same CC are given the same label. FIG. 9A is a diagram for describing an example of a result of the relevant process, and FIG. 9B is a diagram for describing an example of an image obtained by performing the edge extraction on the scan image of FIG. 9A. In the image of FIG. 9B, three CCs (an edge CC 901, an edge CC 902, and an edge CC 903) are extracted.

Next, in S810, the system control unit 111 refers to the RAM 113, obtains information of the edge CCs, and performs a noise determination process on each edge CC. In the noise determination process, it is determined whether or not the edge CC is noise. When it is determined that the edge CC is not noise, the system control unit 111 advances the process to S820. On the other hand, when it is determined that the edge CC is noise, the system control unit 111 does not perform the synthesis process of synthesizing the threshold binary image and the edge image, and ends the process.

The noise determination process is performed by referring to a noise determination table illustrated in FIG. 10. The system control unit 111 determines that the edge CC is noise when the condition described in the noise determination table is satisfied.

For example, as a condition 1, the system control unit 111 determines whether or not the height of an edge CC is larger than a threshold. Then, the system control unit 111 determines that there is noise when the height of the edge CC is larger than the threshold. As the threshold, a value obtained by multiplying the mode value of the height of the character string area obtained in S400 by a predetermined coefficient is used. Here, it can be expected that the height of the character string area is approximated to a character height in a document. In a case where the height of the edge CC is larger than the character height in the document, it can be determined that the edge is not an edge extracted from the character pixel, that is, there is a high possibility that the edge CC is noise. Therefore, the character height is the basis of threshold calculation.

Further, for example, as a condition 2, the system control unit 111 determines that there is noise, when the height of the edge CC is smaller than the threshold and when the edge CC and the threshold binary image are not continuous as a result of synthesizing the edge CC and the threshold binary image. More specifically, when the height of the edge CC does not exceed the threshold approximated to the character height, the system control unit 111 synthesizes the edge CC and the threshold binary image. Then, as a result of the synthesis, the system control unit 111 determines that there is noise when the pixel of the edge CC and the pixel of the threshold binary image are not continuous. That is, in cases where the edge CC is small and where the pixels are not continuous even when the edge CC is synthesized with the threshold binary image, it can be assumed that the edge CC is a minute edge isolated from the character pixel and is noise.

In the example of FIG. 9B, none of the three edge CCs satisfies the condition 1, but the edge CC 903 satisfies the condition 2. Therefore, the edge CC 903 is determined to be noise due to the condition 2.

Incidentally, in the present embodiment, although the character height included in the scan image is estimated using the height of the character string area, a different method may be used. For example, the character recognition process may be performed on the character string area, and thus the character height may be calculated from a result of the character recognition process. If a blurred character is included, accuracy of the character recognition process may become an issue. However, if there are the more non-blurred characters than the blurred characters, it can be expected that the statistically large number of character heights become an effective value.

The process in next S820 is the same as that in S430 of FIG. 4. The system control unit 111 synthesizes the edge image, determined not to be noise, and the threshold binary image.

As described above, according to the third embodiment, by performing the noise determination of the edge image, it is possible to avoid that noise that is not the character pixel is mixed in the synthesis result of the edge image and the threshold binary image.

Fourth Embodiment (Blurred Character Determination)

In the above embodiments, the process of performing the edge image synthesis is performed on all the threshold binary images. However, the edge image synthesis process may be adaptively performed according to a state of the threshold binary image. For example, when the character pixels can be converted into the binary image without excess and deficiency using the threshold binary image, application of the edge image synthesis process does not improve accuracy of the character recognition process. As just described, when the edge image synthesis process is not necessary, load reduction and speed improvement of the process can be expected by not performing the edge image extraction or synthesis process. In the fourth embodiment, a process of determining a state of the threshold binary image and controlling whether or not to perform the edge image synthesis will be described. Incidentally, the description of the contents common to the above embodiments such as the control flow and the like will be omitted, and a process that is a difference from the already described embodiments will be described. Although the process in the fourth embodiment is also performed together with the processes in the first to third embodiments described above, only any one of these processes may be performed.

Figure 11:
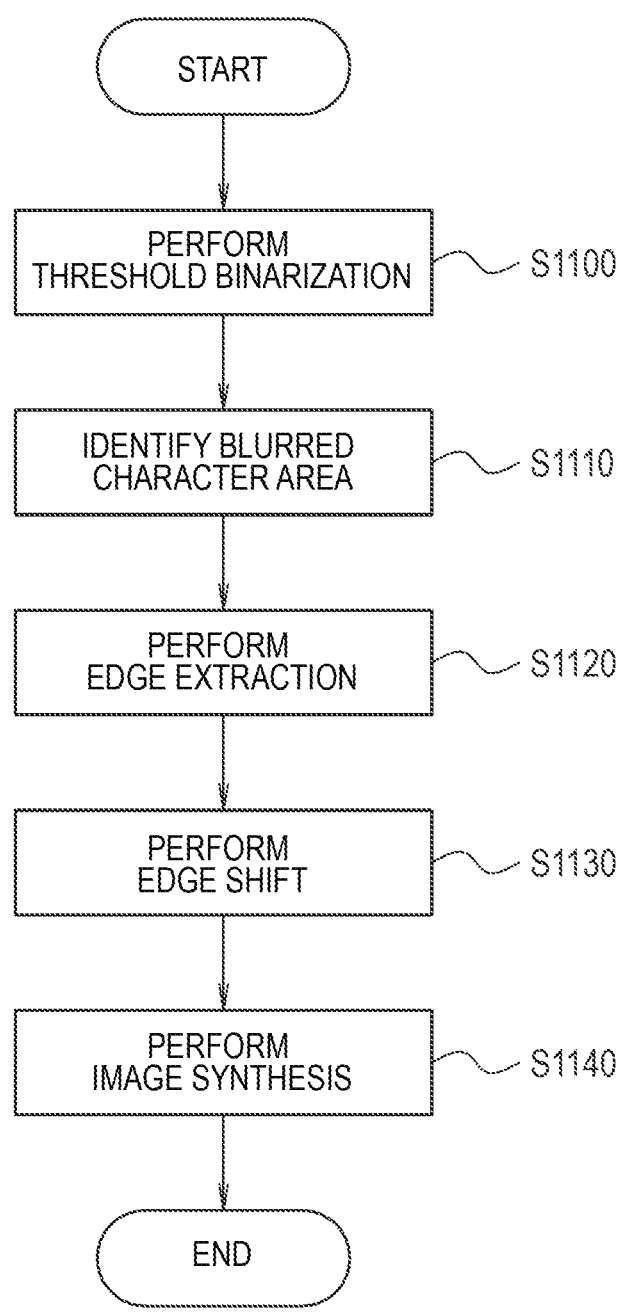
FIG. 11 is a flowchart of the blurred character interpolation binarization process according to a fourth embodiment.

FIG. 11 is a flowchart for describing an example of the flow of the blurred character interpolation binarization process according to the fourth embodiment. The process of this flowchart is realized by the system control unit 111 of the information processing apparatus 110 executing in accordance with the program stored in the ROM 112.

In this flowchart, parts of processes have already been explained with reference to FIG. 4. More specifically, the process in S1100 is the same as that in S400, the process in S1130 is the same as that in S420, and the process in S1140 is the same as that in S430. Therefore, the descriptions of these processes will be omitted, and only process steps different from FIG. 4 will limitedly be described.

In S1110, the system control unit 111 refers to the RAM 113, thus obtains the threshold binary image, determines the image state of the threshold binary image, and identifies an area where a blur of character occurs (blurred character area). The identified blurred character area is stored in the RAM 113 as rectangular information indicating the position and size of the character area. Details of the process in S1110 will be described later with reference to FIG. 12.

In S1120, the system control unit 111 refers to the RAM 113, and thus obtains the scan image and the rectangular information of the blurred character area. Further, the system control unit 111 performs the edge extraction process limitedly in the blurred character area in the obtained scan image. The content of the edge process is the same as the process described in S410.

As described above, the subsequent processes from S1130 are the same as the respective processes described in FIG. 4. When the threshold binary image and the edge image are synthesized after the shift process of the edge image in regard to only the portion determined to be the blurred character area, the final binary image is generated. In the area other than the blurred character area, the edge image is not generated, so that the synthesis process with the threshold binary image is not performed. As a result, the threshold binary image is adopted as the final binary image.

Figure 12:
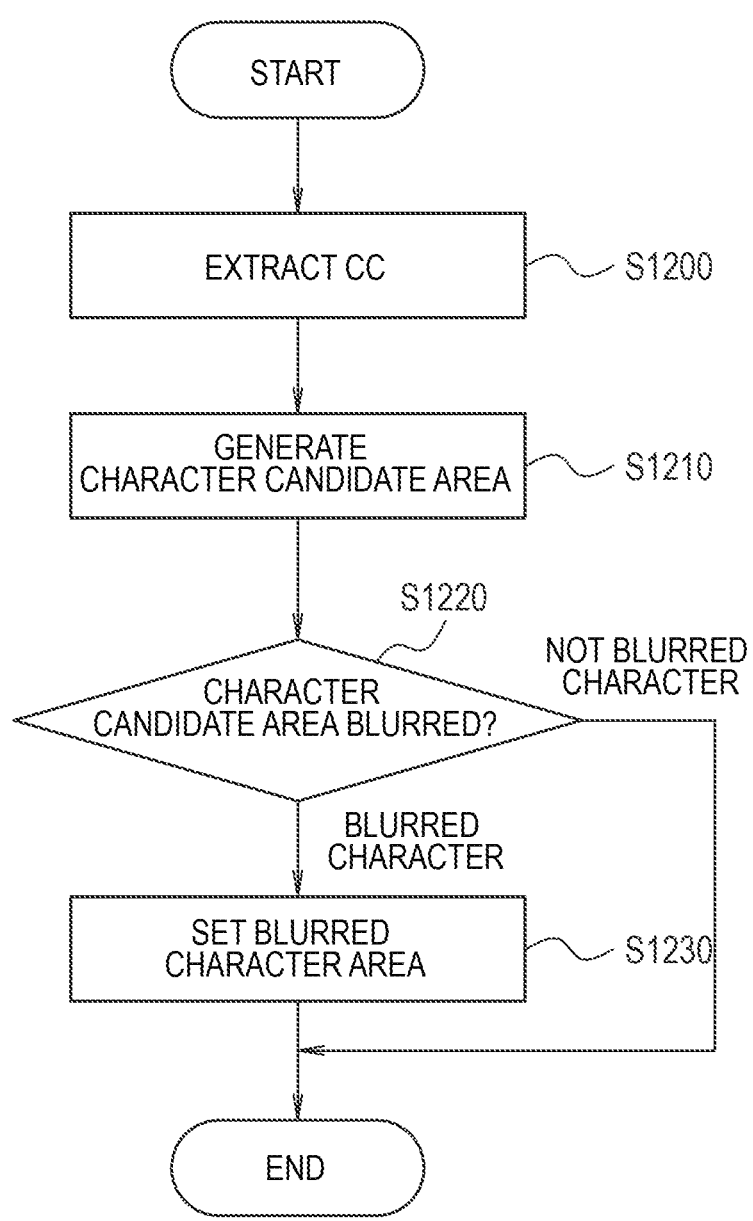
FIG. 12 is a flowchart for describing a blurred character determination process.

Subsequently, the details of the process of identifying the blurred character area in S1110 of FIG. 11 will be described with reference to FIG. 12. FIG. 12 is the flowchart for describing an example of the process of identifying the blurred character area in the present embodiment.

In S1200, the system control unit 111 refers to the RAM 113, and thus obtains the threshold binary image. Further, the system control unit 111 extracts the CC of the threshold binary image, and stores extracted information in the RAM 113. Here, the CC extraction process is the same as the process in S800.

Next, in S1210, the system control unit 111 refers to the RAM 113, and thus obtains CC information. Further, the system control unit 111 obtains circumscribed rectangle information of each CC from the obtained CC information. Subsequently, the system control unit 111 integrates, as a single character candidate area, the CC circumscribed rectangles that exist within a prescribed distance and are in a relationship that the integrated areas satisfy a prescribed aspect ratio, and stores an integrated-result rectangular area in the RAM 113. The integration of the CC circumscribed rectangles is realized by making the circumscribed rectangle that includes all the CC circumscribed rectangles satisfying the above conditions (i.e., existing within the prescribed distance, and the aspect ratio of the integrated area being within the prescription). Here, the distance between the CC circumscribed rectangles indicates the distance of the circumscribed rectangle end.

Figure 13A:
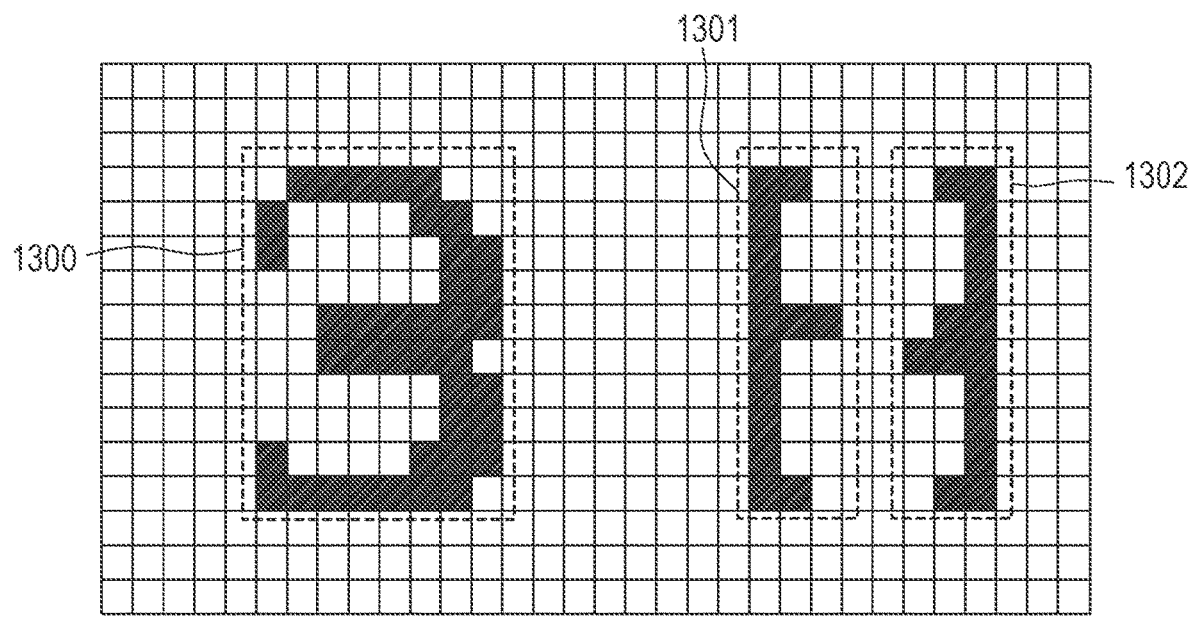
FIGS. 13A and 13B are diagrams for describing an example of a character candidate area.
Figure 13B:
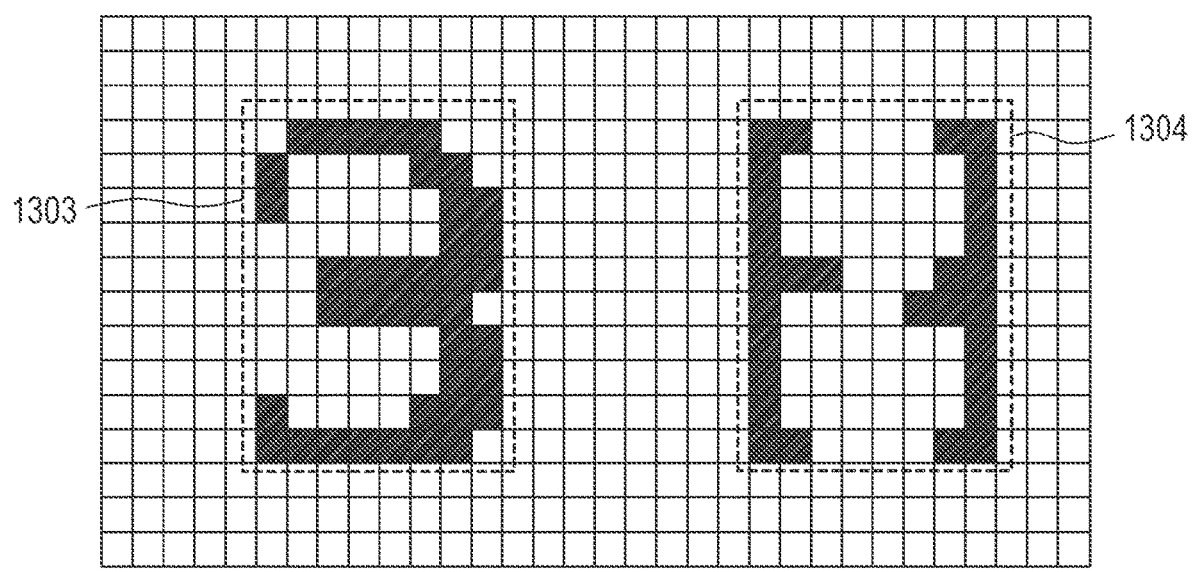

FIGS. 13A and 13B are diagrams for describing an example of the character candidate area. The character candidate areas that are integrated using CC circumscribed rectangles 1300, 1301 and 1302 are character candidate areas 1303 and 1304. Since the CC circumscribed rectangle 1300 does not satisfy the prescribed distance from the other CC circumscribed rectangles 1301 and 1302, this CC circumscribed rectangle is not integrated with the other CC circumscribed rectangles and is set as the character candidate area 1303. On the other hand, since the CC circumscribed rectangles 1301 and 1302 satisfy the condition that they are within the prescribed distance, these two CC circumscribed rectangles are integrated. Thus, as the character candidate area, the new rectangular area 1304 including the CC circumscribed rectangles 1301 and 1302 is generated.

Next, in S1220, the system control unit 111 refers to the RAM 113, obtains information of the character candidate area, and determines whether or not the character pixel existing in the information has a blur. Such blur determination is performed based on the positional relationship of the CC circumscribed rectangles existing in the character candidate area. More specifically, in a case where the plurality of CC circumscribed rectangles exist in the character candidate area and these CC circumscribed rectangles are not in an inclusive relationship, the system control unit 111 determines that the blur has occurred. Then, when it is determined that the blur has occurred, the system control unit 111 advances the process to S1230. On the other hand, when it is determined that the blur does not occur, the system control unit ends the process.

In S1230, the system control unit 111 stores in the RAM 113 the character candidate area determined as being blurred in S1220, as the blurred character area.

As described above, according to the fourth embodiment, by identifying the blurred character area, it is possible to eliminate the need for edge extraction and synthesis processes in regard to the area where there is no blurred character, thereby improving the process speed and reducing the storage device to be used.

Incidentally, in the present embodiment, the process of S1140 is described as being the same as that of S430, but the process described in the second embodiment or the third embodiment can also be applied. In this case, the processes described in the present embodiment are applied to the processes up to S1130. After that, the process corresponding to S1140 (S430) is replaced with the process (second embodiment) described with reference to FIG. 6 or the process (third embodiment) described with reference to FIG. 8. By performing the relevant process, it is possible to apply the effect described in the second or third embodiment limitedly to the blurred characters, so that it is possible to realize the process efficiency also in case of performing the processes in the second and third embodiments.

OTHER EMBODIMENTS

A program for realizing one or more functions in the signal process according to the present invention can be supplied to a system or an apparatus via a network or a storage medium. And, the one or more functions can be realized by the program read and execute with one or more processors in a computer of the system or the apparatus.

The above embodiments are merely examples of concretization in case of carrying out the present invention, and the technical scope of the present invention should not limitedly be interpreted by these embodiments. That is, the present invention can be carried out in various forms without departing from its technical idea or its main features.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-127180, filed Jul. 8, 2019, which is hereby incorporated by reference herein in its entirety.

What is claimed is:

1. An image processing apparatus comprising:
at least one memory that stores a program; and
at least one processor that executes the program to:
generate a binary image from a multivalued image using a threshold, wherein the multivalued image includes at least one character image;
identify pixels of edge candidates of the at least one character image based on gradation values of pixels on the multivalued image;
generate an edge image by shifting each position of the identified pixels of the edge candidates to a position of a pixel that is adjacent to each of the identified pixels of the edge candidates and has a smaller gradation value on the multivalued image; and
generate a synthetic binary image by synthesizing the generated edge image and the generated binary image.

2. The image processing apparatus according to claim 1, wherein the at least one processor executes the program to perform an interpolation process to the generated synthetic binary image.

3. The image processing apparatus according to claim 2, wherein the interpolation process includes a shading process performed to the synthetic binary image and regenerates a synthetic binary image from the image subjected to the shading process.

4. The image processing apparatus according to claim 1, wherein the at least one processor generates the synthetic binary image by performing noise determination to the generated edge image and thereafter synthetizing the generated binary image and the generated edge image based on a result of the noise determination.

5. The image processing apparatus according to claim 4, wherein at least one processor generates the synthetic binary image by synthesizing the generated binary image and pixels of the generated edge image determined in the noise determination as being not noise.

6. The image processing apparatus according to claim 4, wherein, in a state where the at least one processor determines in the noise determination that the generated edge image is the noise, in at least any one of a case where a CC (Connected Component) is extracted from the generated edge image and a height of the extracted CC is larger than a threshold or a case where the height of the extracted CC is smaller than the threshold and pixels of the CC and the generated binary image are not continuous as a result of synthesizing the CC and the generated binary image.

7. The image processing apparatus according to claim 1, wherein the multivalued image is a scanned image obtained by scanning a document.

8. The image processing apparatus according to claim 7, wherein:
the at least one processor executes the program to identify a blurred character area from the multivalued image, and
the at least one processor generates the synthetic binary image by synthesizing the generated binary image and the generated edge image only in regard to the identified blurred character area.

9. The image processing apparatus according to claim 8, wherein a CC (Connected Component) is extracted from the multivalued image, a character candidate area is generated based on a position of the extracted CC, and the identification of the blurred character area is performed in regard to the generated character candidate area.

10. An image processing method comprising:
- generating a binary image from a multivalued image using a threshold, wherein the multivalued image includes at least one character image;
- identifying pixels of edge candidates of the at least one character image based on gradation values of pixels on the multivalued image;
- generating an edge image by shifting each position of the identified pixels of the edge candidate to a position of a pixel that is adjacent to each of the identified pixels of the edge candidate and has a smaller gradation value on the multivalued image; and
- generating a synthetic binary image by synthesizing the generated edge image and the generated binary image.

11. A non-transitory computer-readable storage medium storing a program executable by a processor to execute an image processing method comprising:
- generating a binary image from a multivalued image using a threshold, wherein the multivalued image includes at least one character image;
- identifying pixels of edge candidates of the at least one character image based on gradation values of pixels on the multivalued image;
- generating an edge image by shifting each position of the identified pixels of the edge candidate to a position of a pixel that is adjacent to each of the identified pixels of the edge candidate and has a smaller gradation value on the multivalued image; and
- generating a synthetic binary image by synthesizing the generated edge image and the generated binary image.

* * * * *